Patented Oct. 21, 1924.

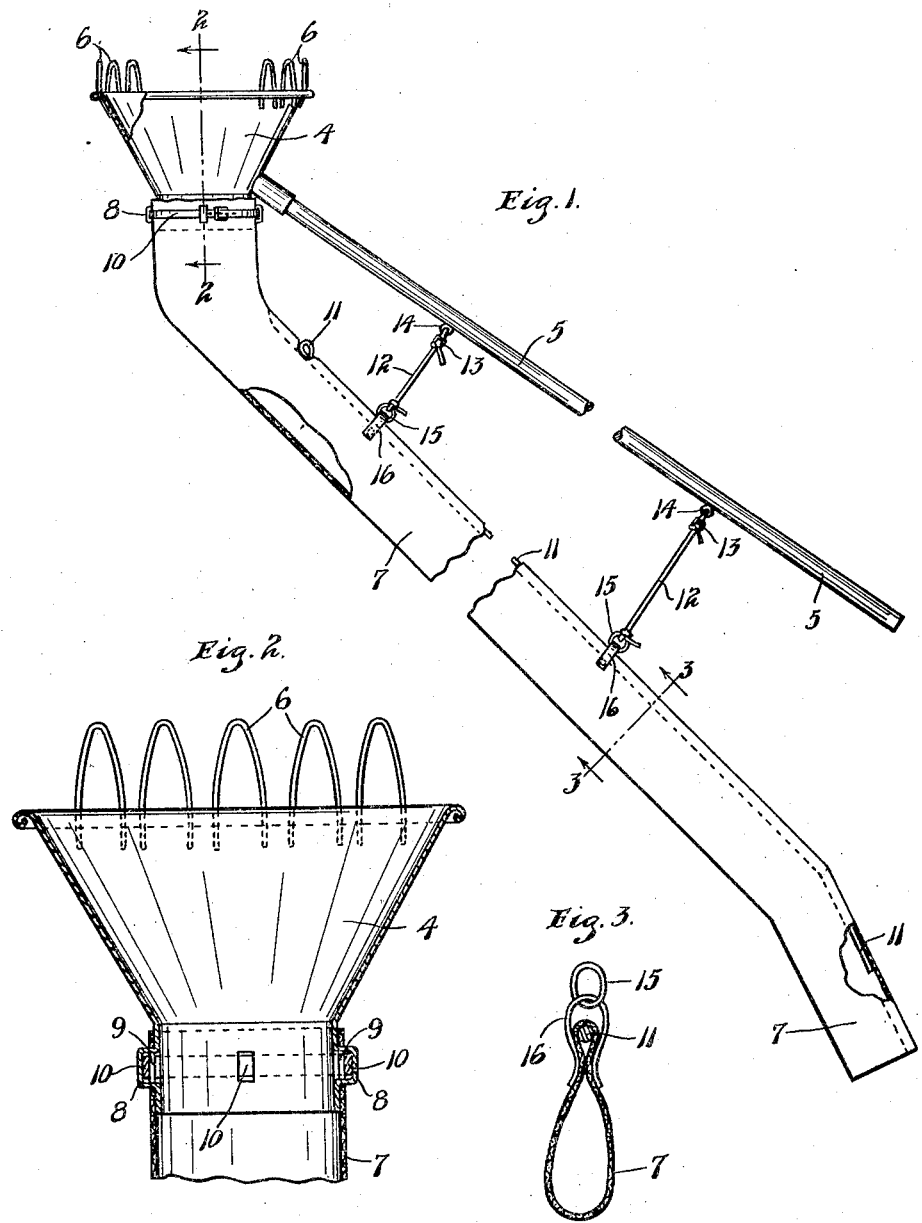

1,512,680

UNITED STATES PATENT OFFICE.

AXEL V. EDSTROM, OF WELCH, MINNESOTA.

FRUIT PICKER.

Application filed June 22, 1923. Serial No. 647,033.

*To all whom it may concern:*

Be it known that I, AXEL V. EDSTROM, a citizen of the United States, residing at Welch, in the county of Goodhue and State of Minnesota, have invented certain new and useful Improvements in Fruit Pickers; and I do hereby declare the following to be a full, clear, and exact description of the invention, such as will enable others skilled in the art to which it appertains to make and use the same.

My invention has for its object to provide a simple but highly efficient fruit picking device which will pick the fruit from the trees and deliver it to the ground or a receptacle thereon without bruising the fruit.

It is a more specific object to provide a device of this kind, the delivery means of which will not interfere in any way with the operator of the device but will still be adjustably supported and held so that the fruit may at all times be freely delivered to a desired point or receptacle on the ground.

To these ends, generally stated, my invention consists of the novel device and combination of devices herein described and set forth in the claims.

The invention is illustrated in the accompanying drawings wherein like notations refer to similar parts throughout the several views and, in which—

Fig. 1 is a side elevation of the invention with some parts broken away;

Fig. 2 is a vertical section taken on the line 2—2 of Fig. 1; and

Fig. 3 is a cross section of the delivery chute taken on the line 3—3 of Fig. 1.

An open bottom picker cup of preferably funnel-shaped construction designated by the numeral 4 is secured to the end of an elongated handling pole 5 and has upstanding picking fingers 6 preferably of bent wire formation upstanding on the upper rim thereof. A flexible tubular delivery chute 7 preferably made of fabric is attached to the lower rim or neck portion of the picker cup 4 in the following manner:

Keeper lugs 8 formed on said neck portion of said picker cup 4 are adapted to pass through slots 9 at the top end of the delivery chute 7 and a strap 10 is then inserted through said keeper lugs and over said top of the delivery chute thus securing the parts together.

A stiffening rod 11 is inserted in a stitched portion of the delivery chute along the edge of said chute nearest the handling pole 5. The delivery chute 7 is adjustably supported from the handling pole 5 by means of a plurality of flexible hanger straps 12 which are detachably connected preferably by snap hooks 13 at their upper ends to spaced eyes 14 on the handling pole 5 and which have their lower ends adjustably tied to rings 15 which are carried by loops 16 secured to the stiffened edge of said delivery chute. The delivery chute 7 is considerably longer than the handling pole 5 and the stiffening rod 11 at the lower end of the chute is bent downwardly toward itself. The extreme end of said chute is left unstiffened.

The delivery chute 7 is supported at a desired angle to the handling pole 5 so that the lower end of the chute will never impede the operator in using the device or get in the way of his feet. This angle may be varied to secure the best results in the delivery of the fruit according to the height of the trees upon which the picker is used. The bent delivery end of the chute 7 permits proper delivery to the ground with the raising and lowering of the picker cup necessary in picking fruit.

The stiffened upper edge of the chute will always keep the chute supported in a straight line and will prevent the chute from sagging at some intermediate portion and impeding the passage of the fruit therein or the bruising of the fruit.

The flexible hanger straps permit the chute to be supported from the handling pole at a desired angle so that the bottom of the chute will always be at a sufficient distance from the handling pole 5 to be out of the way of the operator.

In actual practice the device has demonstrated a high efficiency for picking fruit and delivering the same to the ground without bruising. It is light in structure, may be readily assembled and, due to the improved means for supporting the delivery portion of the picker and keeping it properly aligned, the operator will at no time have to carry the additional weight of the fruit collected at some point in the chute.

It will, of course, be understood that various changes may be made in the form, details and arrangement of the parts without departing from the scope of the invention.

What is claimed is:

1. A fruit picker comprising an open bottomed picker cup, an elongated handling pole attached thereto, a flexible delivery chute attached to the bottom end of said cup, a stiffening means along one edge of said chute adapted to hold said chute in substantially a straight line, and adjustable means supporting said stiffening means from said pole, whereby the angle between said pole and said chute may be varied.

2. A fruit picker comprising an open bottomed picker cup secured to the end of a handling pole, a flexible delivery chute attached at one end to the bottom of said picker cup and open at its lower end for delivery therefrom, a stiffening rod along the edge of said chute nearest said pole and flexible adjustable hanger straps fastened at their lower ends to said stiffening rod and having their upper ends detachably connected to said pole.

In testimony whereof I affix my signature.

AXEL V. EDSTROM.